United States Patent
Jeon

(10) Patent No.: US 11,809,344 B2
(45) Date of Patent: Nov. 7, 2023

(54) PERIPHERAL COMPONENT INTERCONNECT EXPRESS INTERFACE DEVICE AND OPERATING METHOD THEREOF

(71) Applicant: SK hynix Inc., Icheon-si (KR)

(72) Inventor: Yong Tae Jeon, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/527,032

(22) Filed: Nov. 15, 2021

(65) Prior Publication Data

US 2022/0382692 A1 Dec. 1, 2022

(30) Foreign Application Priority Data

Jun. 1, 2021 (KR) .................. 10-2021-0070762

(51) Int. Cl.
| | |
|---|---|
| *G06F 13/16* | (2006.01) |
| *G06F 13/28* | (2006.01) |
| *G06F 13/42* | (2006.01) |
| *G06F 11/07* | (2006.01) |

(52) U.S. Cl.
CPC ...... *G06F 13/1684* (2013.01); *G06F 11/0772* (2013.01); *G06F 13/1689* (2013.01); *G06F 13/28* (2013.01); *G06F 13/4221* (2013.01); *G06F 2213/0026* (2013.01)

(58) Field of Classification Search
CPC .. G06F 13/1684; G06F 11/0772; G06F 13/28; G06F 13/4221; G06F 13/1689; G06F 2213/0026; G06F 1/24; G06F 13/385; G06F 13/4022
See application file for complete search history.

(56) References Cited

U.S. PATENT DOCUMENTS

| | | |
|---|---|---|
| 7,191,255 B2 | 3/2007 | Wong et al. |
| 10,366,044 B2 | 7/2019 | Choi |
| 10,503,679 B2 | 12/2019 | Huang |
| 10,713,209 B2 | 7/2020 | Jen |
| 2006/0090014 A1 | 4/2006 | Wong |
| 2012/0166699 A1 | 6/2012 | Kumar |
| 2014/0189427 A1 | 7/2014 | Jayaprakash Bharadwaj et al. |

(Continued)

FOREIGN PATENT DOCUMENTS

| | | |
|---|---|---|
| KR | 10-1565357 B2 | 9/2014 |
| KR | 10-2018-0037783 A | 4/2018 |

(Continued)

OTHER PUBLICATIONS

Non-Final Rejection of U.S. Appl. No. 17/526,995 from USPTO dated Oct. 6, 2022.

(Continued)

*Primary Examiner* — Glenn A. Auve

(57) ABSTRACT

A Peripheral Component Interconnect Express (PCIe) interface device includes a PCIe layer and a PCIe controller. The PCIe layer performs communication between a host and a Direct Memory Access (DMA) device. The PCIe controller switches an operating clock from a PCIe clock generated based on a reference clock to an internal clock, processes data of the PCIe layer on the basis of the internal clock, and recovers a link with respect to the host, when a reset signal received from the host is asserted or the reference clock is off.

28 Claims, 7 Drawing Sheets

(56) References Cited

U.S. PATENT DOCUMENTS

| | | | |
|---|---|---|---|
| 2015/0370683 A1 | 12/2015 | Nishiyama et al. | |
| 2016/0267048 A1* | 9/2016 | Pethe | G06F 13/4027 |
| 2017/0357609 A1 | 12/2017 | Long | |
| 2019/0303342 A1* | 10/2019 | Jen | G06F 13/4221 |
| 2020/0226084 A1 | 7/2020 | Das Sharma | |
| 2020/0349064 A1 | 11/2020 | Lim | |
| 2021/0073157 A1 | 3/2021 | Olarig | |
| 2021/0318815 A1 | 10/2021 | Olarig | |

FOREIGN PATENT DOCUMENTS

| | | |
|---|---|---|
| KR | 10-2018-0095765 A | 8/2018 |
| KR | 10-2020-0010139 A | 1/2020 |

OTHER PUBLICATIONS

"PCI Express® Base Specification Revision 4.0 Version 1.0", Sep. 27, 2017.

"PCI Express® Base Specification Revision 5.0 Version 1.0", May 22, 2019.

\* cited by examiner

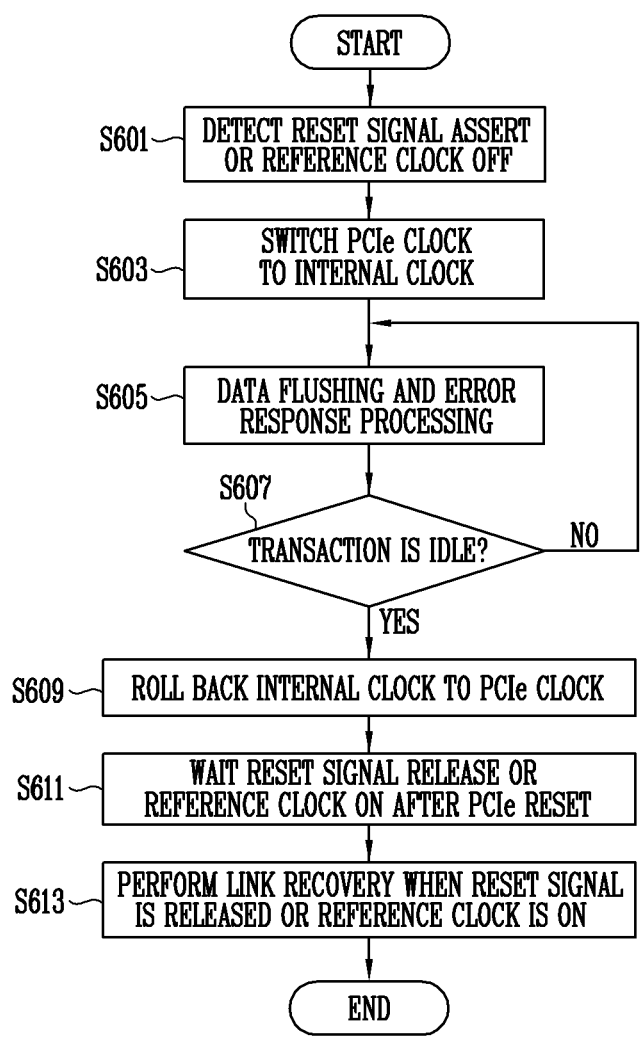

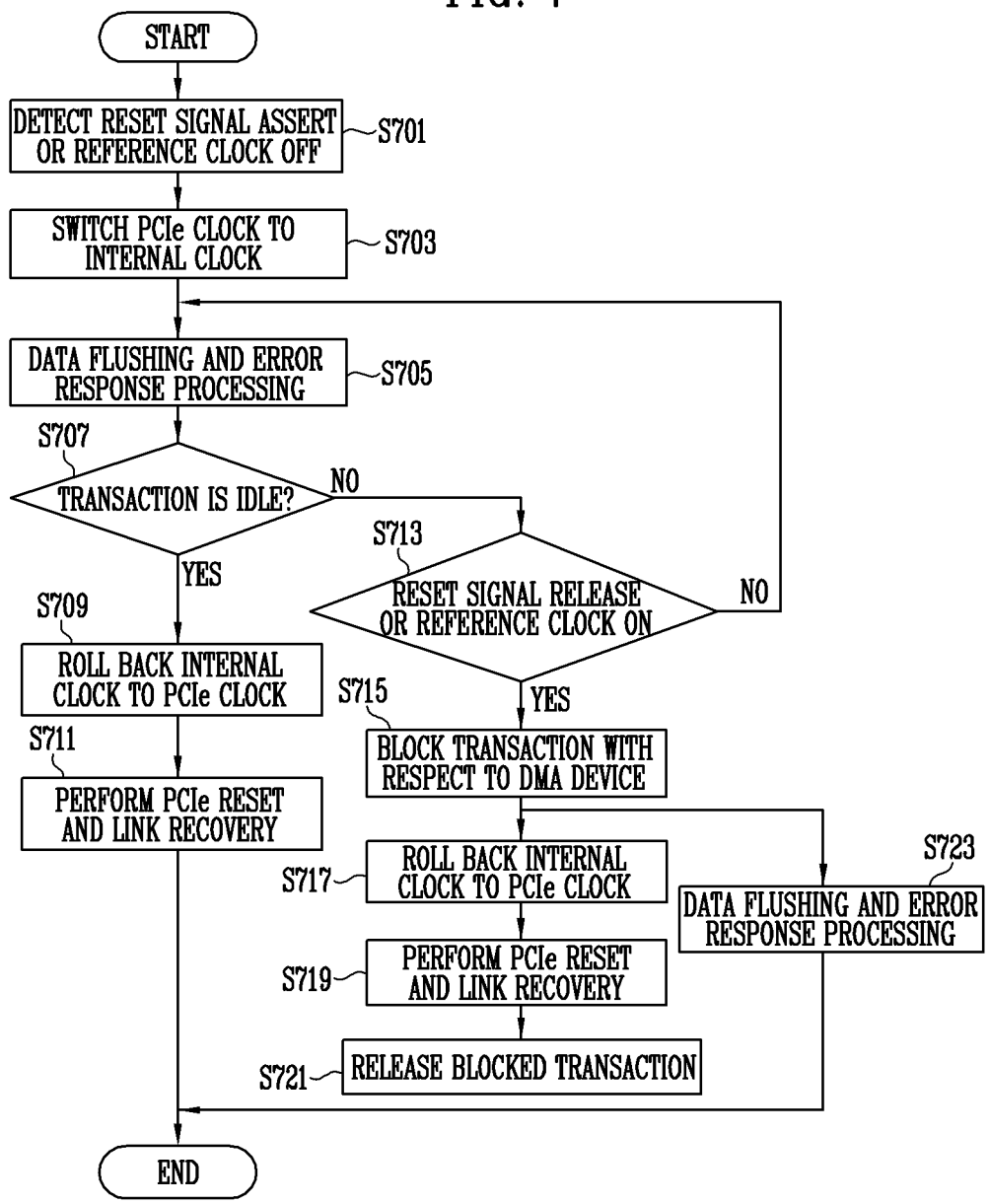

PERIPHERAL COMPONENT INTERCONNECT EXPRESS INTERFACE DEVICE AND OPERATING METHOD THEREOF

CROSS-REFERENCE TO RELATED APPLICATION

The present application claims priority under 35 U.S.C. § 119(a) to Korean patent application number 10-2021-0070762, filed on Jun. 1, 2021, in the Korean Intellectual Property Office, the entire disclosure of which is incorporated herein by reference.

BACKGROUND

1. Technical Field

Various embodiments generally relate to an electronic device, and more particularly, to a Peripheral Component Interconnect Express (PCIe) interface device and a method of operating the PCIe interface device.

2. Related Art

Peripheral Component Interconnect Express (PCIe) refers to an interface with a serial configuration for data communication. A PCIe-based storage device may support multi-port and multi-function. A PCIe-based storage device may be virtualized or non-virtualized and achieve Quality of Service (QoS) of host I/O commands through at least one PCIe function.

A storage device may store data under the control of a host device such as a computer or a smart phone. A storage device may include a memory device storing data and a memory controller controlling the memory device. Memory devices may be divided into volatile memory devices and non-volatile memory devices.

A volatile memory device may retain data as long as power is being supplied, and may lose stored data in the absence of power supply. Types of volatile memory devices may include Static Random Access Memory (SRAM), Dynamic Random Access Memory (DRAM), and the like.

A non-volatile memory device does not lose data even in the absence of power supply. Types of non-volatile memory devices may include Read Only Memory (ROM), Programmable ROM (PROM), Electrically Programmable ROM (EPROM), Electrically Erasable and Programmable ROM (EEPROM), flash memory, and the like.

SUMMARY

Various embodiments of the present disclosure are directed to a PCIe interface device having improved link recovery performance and an operating method thereof.

According to an embodiment, a Peripheral Component Interconnect Express (PCIe) interface device may include a PCIe protocol stack performing communication between a host and a Direct Memory Access (DMA) device, and a PCIe controller switching an operating clock from a PCIe clock, generated based on a reference clock, to an internal clock, processing data of the PCIe protocol stack on the basis of the internal clock, and recovering a link with respect to the host, when a reset signal received from the host is asserted or the reference clock is off.

According to an embodiment, a method of operating a Peripheral Component Interconnect Express (PCIe) interface device including a PCIe protocol stack performing communication between a host and a Direct Memory Access (DMA) device may include switching an operating clock from a PCIe clock, generated based on a reference clock, to an internal clock, when a reset signal received from the host is asserted or the reference clock is off, flushing data of the PCIe protocol stack on the basis of the internal clock, and processing a transaction with respect to the DMA device.

BRIEF DESCRIPTION OF THE DRAWINGS

FIG. 6 is a flow chart illustrating operations of a PCIe interface device according to an embodiment of the present disclosure.

FIG. 7 is a flow chart illustrating operations of a PCIe interface device according to an embodiment of the present disclosure.

DETAILED DESCRIPTION

Specific structural or functional descriptions of examples of embodiments in accordance with concepts that are disclosed in this specification are illustrated only to describe the examples of embodiments in accordance with the concepts. Examples of embodiments in accordance with the concepts may be carried out in various forms, however, and the descriptions are not limited to the examples of embodiments described in this specification.

Figure 1:
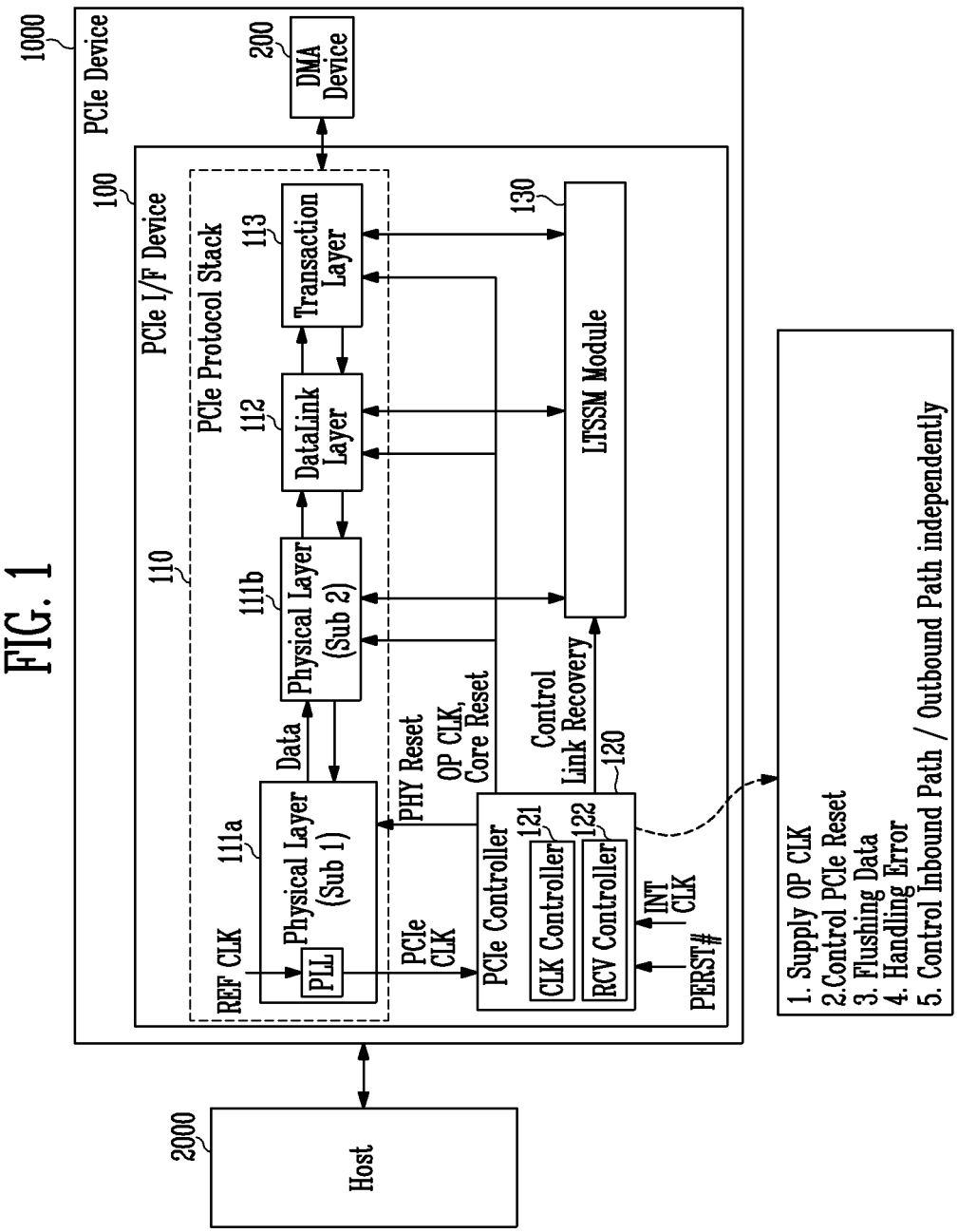
FIG. 1 is a diagram illustrating communication between a PCIe device and a host according to an embodiment of the present disclosure.

FIG. 1 is a diagram illustrating communication between a PCIe device and a host according to an embodiment of the present disclosure.

Referring to FIG. 1, a PCIe device 1000 may include a PCIe interface device 100 and a Direct Memory Access (DMA) device 200. The PCIe device 1000 may include at least one DMA device 200. The DMA device 200 may include a Non-Volatile Memory Express (NVMe) module, an Ethernet card, a sound card, a graphic card, an AI CPU module, and an AI SoC module. The DMA device 200 may include a data communication device that is coupled to the NVMe module, the Ethernet card, the AI CPU module, and the AI SoC module.

The PCIe interface device 100 may perform communication between a host 2000 and the DMA device 200.

The PCIe interface device 100 may transfer a request or data, received from the host 2000, to the DMA device 200. The PCIe interface device 100 may transfer a response or data received from the DMA device 200 to the host 2000.

The PCIe interface device 100 may communicate with the host 2000 through a physical lane.

An upstream port of the PCIe interface device 100 may be coupled to a downstream port of the host 2000 through at least one physical lane. For example, a receiving side RX in the upstream port of the PCIe interface device 100 may be coupled to a transmitting side TX in the downstream port of the host 2000. In a further example, the transmitting side TX in the upstream port of the PCIe interface device 100 may be coupled to the receiving side RX in the downstream port of the host 2000.

The PCIe interface device 100 may receive a reference clock (REF CLK) and a reset signal PERST # from the host 2000. The PCIe interface device 100 may perform communication between the host 2000 and the DMA device 200 on the basis of the reference clock (REF CLK). The PCIe interface device 100 may initialize and set up a link between the host 2000 and the DMA device 200 in response to the reset signal PERST #.

The PCIe interface device 100 may include a PCIe protocol stack 110, a PCIe controller 120, and an LTSSM module 130.

The PCIe protocol stack 110 may perform data communication between the host 2000 and the DMA device 200.

The PCIe protocol stack 110 may include physical layers 111a and 111b, a data link layer 112, and a transaction layer 113.

The physical layer 111a may be an electrical sub-block and be physically coupled to the host 2000 through a lane. The physical layer 111a may transmit and receive data to and from the host 2000 through a receiving side RX and a transmitting side TX in a lane. The physical layer 111a may include a phase locked loop (PLL) circuit, which generates a PCIe clock (PCIe CLK) on the basis of the reference clock (REF CLK).

The physical layer 111b may be a logical sub-block and receive a physical layer packet from the host 2000 through the physical layer 111a. The physical layer 111b may provide the data link layer 112 with a data link layer packet. The physical layer 111b may provide the data link layer 112 with a data link layer packet which includes a data link layer packet included in a received physical layer packet and data included in the physical layer packet.

The physical layer 111b may generate a physical layer packet on the basis of the data link layer packet received from the data link layer 112, and may provide the generated physical layer packet to the host 2000 through the physical layer 111a. The physical layer 111b may operate on the basis of an operating clock (OP CLK) provided from the PCIe controller 120.

The data link layer 112 may receive a data link layer packet from the physical layer 111b, and may provide the transaction layer 113 with a transaction layer packet which includes a transaction layer packet included in a received data link layer packet and data included in the data link layer packet. The data link layer 112 may generate a data link layer packet based on a transaction layer packet received from the transaction layer 113 and may provide the generated data link layer packet to the physical layer 111b. The data link layer 112 may operate on the basis of the operating clock (OP CLK) provided from the PCIe controller 120.

The transaction layer 113 may receive a transaction layer packet from the data link layer 112 and may provide the DMA device 200 with a data payload included in the received transaction layer packet. The transaction layer 113 may generate a transaction layer packet based on the data payload received from the DMA device 200 and may provide the generated transaction layer packet to the data link layer 112. The transaction layer 113 may operate on the basis of the operating clock (OP CLK) provided from the PCIe controller 120.

According to an embodiment, the PCIe controller 120 may include a clock controller 121 and a recovery controller 122.

The clock controller 121 may set the operating clock (OP CLK) on the basis of the PCIe clock (PCIe CLK) received from the physical layer 111a or an internal clock (INT CLK) of the PCIe device. The clock controller 121 may provide the operating clock (OP CLK) to the PCIe protocol stack 110.

The clock controller 121 may switch the operating clock (OP CLK) from the PCIe clock (PCIe CLK) to the internal clock (INT CLK) when the reset signal PERST # is asserted from a first state to a second state, or the reference clock (REF CLK) is off.

When a DMA device 200 is idle with respect to a transaction, the clock controller 121 may roll back the operating clock (OP CLK) from the internal clock (INT CLK) to the PCIe clock (PCIe CLK). When the DMA device 200 is busy or active with a transaction, if the reset signal PERST # releases from the second state to the first state, or if the reference clock (REF CLK) is on, then the clock controller 121 may roll back the operating clock (OP CLK) from the internal clock (INT CLK) to the PCIe clock (PCIe CLK).

According to an embodiment, the reset signal PERST # may have a logic value of 0 in the first state and a logic value of 1 in the second state. According to another embodiment, the reset signal PERST # may have a logic value of 1 in the first state and a logic value of 0 in the second state. However, the logic value of the reset signal PERST # in the first and second states may not be limited to this embodiment, but may vary in other embodiments.

The recovery controller 122 may flush data of the PCIe protocol stack 110.

The recovery controller 122 may transact with the DMA device 200. A transaction may be a series of sequences in which requests and responses are transmitted and received between the recovery controller 122 and the DMA device 200. The recovery controller 122 may provide the DMA device 200 with an error response to a request received from the DMA device 200. When error response processing of the DMA device 200 is completed, and an additional request is not received from the DMA device 200, then recovery controller 122 may determine that a transaction with respect to the DMA device 200 is idle.

The recovery controller 122 may reset the PCIe protocol stack 110. When a PCIe reset signal is asserted and a reset of the PCIe protocol stack 110 is completed, the recovery controller 122 may release the PCIe reset signal. The PCIe reset signal may be an internal reset signal of the PCIe interface device 100 that is differentiated from a reset signal PERST # received from the host 2000. The PCIe reset signal may include a PHY reset signal for resetting the physical layer 111a and a core reset signal for resetting the data link layer 112 and the transaction layer 113.

According to an embodiment, when a transaction with respect to the DMA device 200 is idle, the recovery controller 122 may assert a PCIe reset signal. When a reset of the PCIe protocol stack 110 is completed, the recovery controller 122 may wait until the reset signal PERST # is released or the reference clock is on. When the reset signal PERST # is released or the reference clock (REF CLK) is on, the recovery controller 122 may release the PCIe reset signal. After the PCIe reset signal is released, the recovery controller 122 may control the LTSSM module 130 to perform a link recovery operation with respect to the host 2000.

According to an embodiment, when the transaction with respect to the DMA device 200 is busy or active, if the reset signal PERST # is released or the reference clock REF CLK is on, then the recovery controller 122 may block the transaction with respect to the DMA device 200. The recovery controller 122 may assert the PCIe reset signal after blocking the transaction with respect to the DMA device 200. The recovery controller 122 may release the PCIe reset signal when a reset of the PCIe protocol stack 110 is completed. After the PCIe reset signal is released, the recovery controller 122 may control the LTSSM module 130 to perform a link recovery operation with respect to the host 2000. When link training is initiated in the link recovery operation, the recovery controller 122 may release the blocked transaction. The recovery controller 122 may flush residual data of the PCIe protocol stack 110 and may provide the error response to the DMA device 200 in association with the transaction with respect to the DMA device 200.

The recovery controller 122 may independently control an outbound access to the host 2000 and an inbound access to the DMA device 200 of the host 2000. Therefore, although the outbound access is limited because the transaction with respect to the DMA device 200 is not completed, the recovery controller 122 may allow the inbound access to the DMA device 200 from the host 2000 when a link up is established in a link recovery operation.

According to an embodiment, even when the transaction with respect to the DMA device 200 is busy, if the reset signal PERST # is released or the reference clock (REF CLK) is on, then the PCIe protocol stack 110 may be reset immediately, and the link recovery operation for the host 2000 may be initiated, thereby achieving the Quality of Service (QoS) for a link recovery time on the PCIe specifications.

Figure 2:
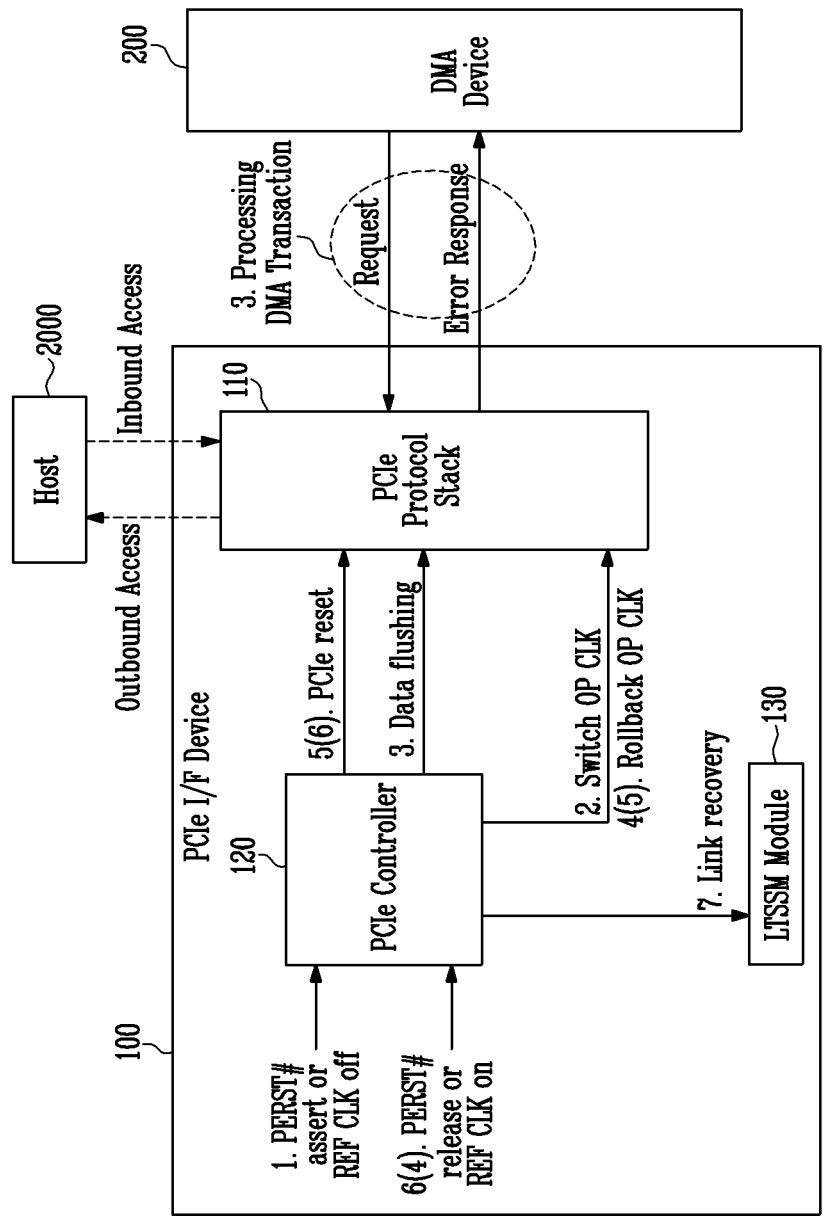
FIG. 2 is a diagram illustrating the configuration and operations of a PCIe interface device according to an embodiment of the present disclosure.

FIG. 2 is a diagram illustrating the configuration and operations of a PCIe interface device according to an embodiment of the present disclosure.

Referring to FIG. 2, a PCIe interface device 100 may include a PCIe protocol stack 110, a PCIe controller 120, and an LTSSM module 130.

The PCIe protocol stack 110 may perform communication between the host 2000 and the DMA device 200. The PCIe protocol stack 110 may include a physical layer, a data link layer, and a transaction layer. The DMA device 200 may include a Non-Volatile Memory Express (NVMe) module, an Ethernet card, a sound card, a graphic card, and the like.

According to an embodiment, the PCIe controller 120 may detect whether the reset signal PERST # is asserted or the reference clock (REF CLK) is off.

When the reset signal PERST # is asserted or the reference clock REF CLK is off, the PCIe controller 120 may switch the operating clock of the PCIe protocol stack 110 from the PCIe clock to the internal clock of the PCIe interface device 100. The PCIe clock may be generated by a phase locked loop (PLL) circuit in the PCIe protocol stack 110 on the basis of the reference clock (REF CLK) received from the host 2000.

The PCIe controller 120 may flush data of the PCIe protocol stack 110. The PCIe controller 120 may process a transaction with respect to the DMA device 200 through the PCIe protocol stack 110. When the error response processing of the DMA device 200 is completed, the PCIe controller 120 may determine that the transaction is idle with respect to the DMA device 200.

The PCIe controller 120 may roll back the operating clock of the PCIe protocol stack 110 from internal clock to the PCIe clock when the transaction with respect to the DMA device 200 is idle.

The PCIe controller 120 may reset the PCIe protocol stack 110 when the operating clock is rolled back to the PCIe clock.

After the PCIe protocol stack 110 is reset, the PCIe controller 120 may detect whether the reset signal PERST # is released or the reference clock (REF CLK) is on.

When the reset signal PERST # is released or the reference clock (REF CLK) is on, the PCIe controller 120 may control the LTSSM module 130 to perform a link recovery operation on the host 2000.

According to an embodiment, the PCIe controller 120 may detect whether the reset signal PERST # is asserted or the reference clock (REF CLK) is off.

When the reset signal PERST # is asserted or the reference clock (REF CLK) is off, the PCIe controller 120 may switch an operating clock of the PCIe protocol stack 110 from the PCIe clock to the internal clock of the PCIe interface device 100.

The PCIe controller 120 may flush data of the PCIe protocol stack 110. The PCIe controller 120 may process the transaction with respect to the DMA device 200 through the PCIe protocol stack 110. When the error response processing of the DMA device 200 is completed, the PCIe controller 120 may determine that the transaction is idle with respect to the DMA device 200.

When the transaction with respect to the DMA device 200 is busy, the PCIe controller 120 may detect whether the reset signal PERST # is released or the reference clock (REF CLK) is on.

When the PCIe controller 120 detects that the reset signal PERST # is released or the reference clock (REF CLK) is on, the PCIe controller 120 may roll back the operating clock of the PCIe protocol stack 110 from the internal clock to the PCIe clock.

The PCIe controller 120 may reset the PCIe protocol stack 110 when the operating clock is rolled back.

The PCIe controller 120 may control the LTSSM module 130 to perform a link recovery operation with respect to the host 2000 when the PCIe protocol stack 110 is reset.

Processing a transaction with respect to the DMA device 200 may be on hold when the reset signal PERST # is released or the reference clock (REF CLK) is on, and may be resumed when the link training in the link recovery operation starts.

Figure 3:
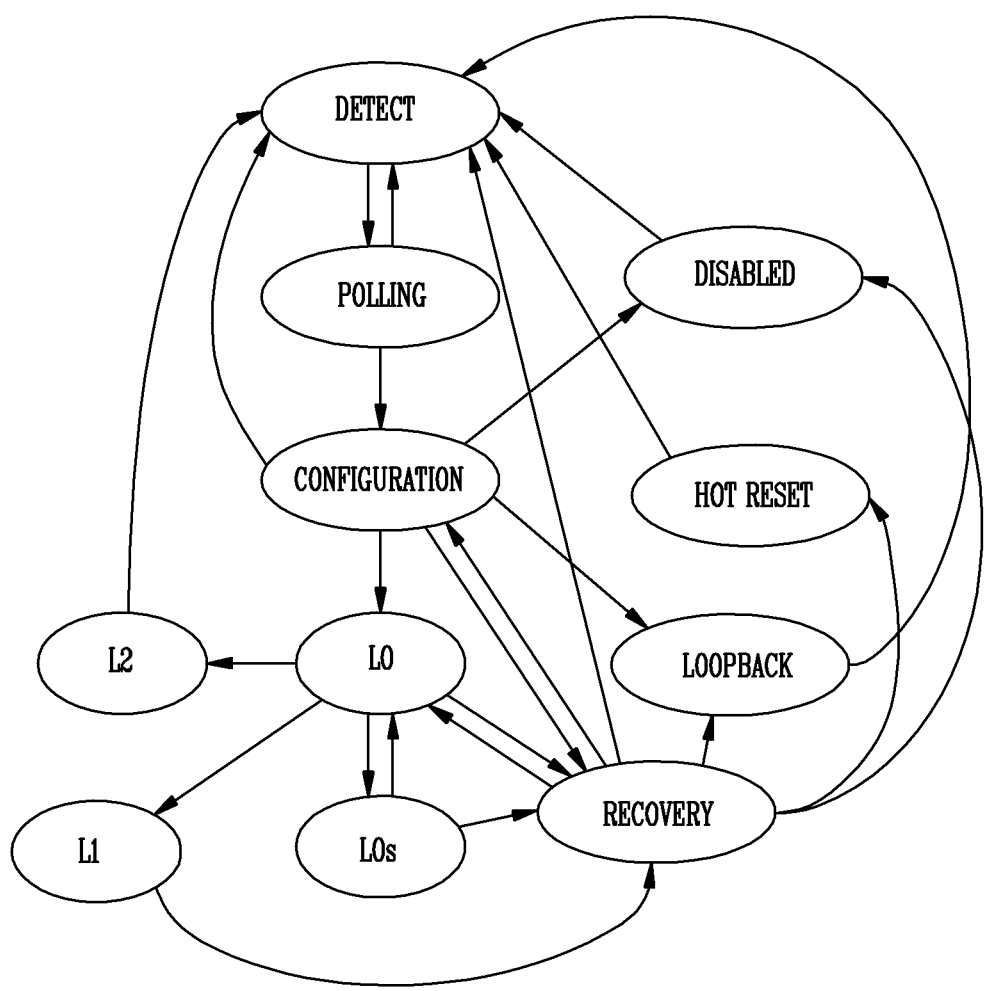
FIG. 3 is a diagram illustrating operations of a Link Training & Status State Machine (LTSSM) module of FIG. 2.

FIG. 3 is a diagram illustrating a Link Training & Status State Machine (LTSSM) module of FIG. 2.

A DETECT step may refer to a step at which a link connected between PCIe components is detected. In other words, a search for a physically coupled lane may be take place in the DETECT step.

The DETECT step may be an initial step of an LTSSM and entered after reset or at the time of booting. In addition, at the DETECT step, all logics, ports and registers may be reset. The DETECT step may be entered when directed. The LTSSM may enter a POLLING step from the DETECT step.

According to an embodiment, in the POLLING step, a lane that enables data communication may be distinguished from among the detected lanes. In other words, in the POLLING step, clocks between the PCIe components may be synchronized, and the lane may be checked for polarity (D+ or D−) and available data transmission speed. Further, in the POLLING step, a boundary between continuous bits in data may be checked. According to an embodiment, the LTSSM may proceed to a CONFIGURATION step from the POLLING step.

According to an embodiment, in the CONFIGURATION step, a connection state of the lane may be checked. For example, in the CONFIGURATION step, a lane width that enables data communication may be determined. In addition, in the CONFIGURATION step, a bit that is marked as PAD of training sequences may be changed into a negotiated number, and negotiation for best performance of both components may be carried out. In the CONFIGURATION step, the transmitter and the receiver may transmit and receive data at negotiated data transmission and reception rates. In addition, in the CONFIGURATION step, lane to lane de-skew, in which parallel bit streams of various lanes arrive at difference devices at different times, may be solved.

According to an embodiment, in the CONFIGURATION step, the LTSSM may proceed to the DETECT step, an L0 step, a RECOVERY step, a LOOPBACK step, or a DISABLED step.

According to an embodiment, in the L0 step, data and control packets may be normally transmitted and received. In other words, transaction layer packets (TLPs) and data link layer packets (DLLPs) may be transmitted and received. In addition, all power management states may start from the L0 step.

According to an embodiment, the LTSSM may proceed to an L1 step, an L2 step, an L0s step, or the RECOVERY step from the L0 step.

According to an embodiment, each of the L0s step, the L1 step, and the L2 step may be intended or used as a power savings state.

More specifically, the L0s step may be a sub-state of the L0 step. The L0s step may allow the link to quickly enter and recover from a power conservation state without going through the RECOVERY step. In addition, the transition from the L0s step to the L0 step may re-establish bit lock, symbol lock and Lane to Lane De-skew. The transmitter and the receiver of the ports at both components may not necessarily be in the L0s step simultaneously. The LTSSM may transition to the L0 step or the RECOVERY step from the L0s step.

More specifically, although the L1 step returns to the L0 step more slowly than to the L0s step, the L1 step may allow additional power savings over the L0s step at the cost of additional resume latency. The L1 step may be entered by active state power management (ASPM) or Power Management Software. The ASPM may refer to a policy that changes the link to a power savings state when a device connected via PCIe is not used. The power management software may refer to a policy that changes the device connected via PCIe to the power savings state.

In addition, the entry to the L1 step may occur after being directed by the data link layer and receiving an electrical idle ordered set (EIOS). The LTSSM may proceed to the RECOVERY step from the L1 step.

More specifically, maximum power may be conserved in the L2 step, and the transmitter and the receiver of the PCIe-connected device may be shut off. In the L2 step, power and clocks may not be guaranteed, but AUX power may be available. The entry into the L2 step may occur after being directed by the data link layer and receiving an electrical idle ordered set (EIOS). The LTSSM may proceed to the DETECT step from the L2 step.

According to an embodiment, the RECOVERY step may be entered when an error occurs in the L0 step, and may transition again to the L0 step after error recovery. In addition, the RECOVERY step may be entered when returning to the L0 step from the L1 step, and the LOOPBACK step, the HOT RESET step, or the DISABLED step is entered from the RECOVERY step.

In the RECOVERY step, bit lock, symbol lock or block alignment, and lane-to-lane de-skew may be re-established. In addition, in the RECOVERY step, a speed of a lane may be changed.

According to an embodiment, the LTSSM may enter the L0 step, the CONFIGURATION step, the DETECT step, the LOOPBACK step, the HOT RESET step, or the DISABLED step from the RECOVERY step.

According to an embodiment, the LOOPBACK step may be intended for test and entered when a bit error rate is measured. In the LOOPBACK step, a loopback bit of the training sequence (TS1) must be set to '1' and the receiver may re-transmit all received packets. The LTSSM may measure the bit error rate in the LOOPBACK step and proceed to the DETECT step.

According to an embodiment, the HOT RESET step may reset the link and use bit 0 in the training sequences (e.g., TS1 and TS2). The LTSSM may proceed to the DETECT step from the HOT RESET step.

According to an embodiment, the DISABLED step may cause the transmitter to be in an electrical idle state when the receiver is in a low impedance state. In the DISABLED step, the link may be disabled until the electrical idle state is terminated. The DISABLED step may use bit 1 in the training control field of the training sequences (e.g., TS1 and TS2). The LTSSM may enter the DISABLED step when being directed by an upper step. The LTSSM may enter the DETECT step from the DISABLED step.

A link up may indicate transitioning from the DETECT step via the POLLING step and the CONFIGURATION step to the L0 step, and a link down may indicate transition again to the DETECT step. Link training may indicate that a physical layer, among PCIe protocol stacks, is in the CONFIGURATION step or the RECOVERY step.

In addition, the LTSSM may set a link up register value at each step. For example, when a link up register is set to a third value, the link up register may be in a link up state, and when the link up register is set to a fourth value, the link up register may have a link down state. When the LTSSM enters the L0 step for the first time, the link up register may be set to the third value.

More specifically, the link up register corresponding to the DETECT step, the POLLING step, the CONFIGURATION step, the LOOPBACK step, the HOT RESET step, and the DISABLED step may be set to the fourth value. The link up register corresponding to the L0 step, the L0s step, the L1 step and the L2 step may be set to the third value.

According to an embodiment, the third value may be 0 and the fourth value may be 1. However, in another embodiment, the third value may be 1 and the fourth value may be 0. According to various embodiments, the values set to the link up register in the link up state and the link down state are not limited to this embodiment.

According to an embodiment, during a link down, data may be flushed, and the PCIe register and the NVMe register may be reset. Therefore, the host may initialize the PCIe register and the NVMe register. When a link down is intended by the host, the host may initialize PCIe and NVMe.

However, when a sudden link down is not intended by the host, failures may occur, such as for example, failures to change a data transmission and reception rate, failures to change a lane, and failures to terminate power savings. In addition, an LTSSM timeout may occur, and the LTSSM may transition to the DETECT step. The sudden link down that is not intended by the host may be a link down between two ports. Thus, an OS and an NVMe driver may not perceive the sudden link down. Therefore, the host may try to access a device without initializing PCIe and NVMe, and a blue screen or interruption of a host operation may occur due to the reset values.

Figure 4:
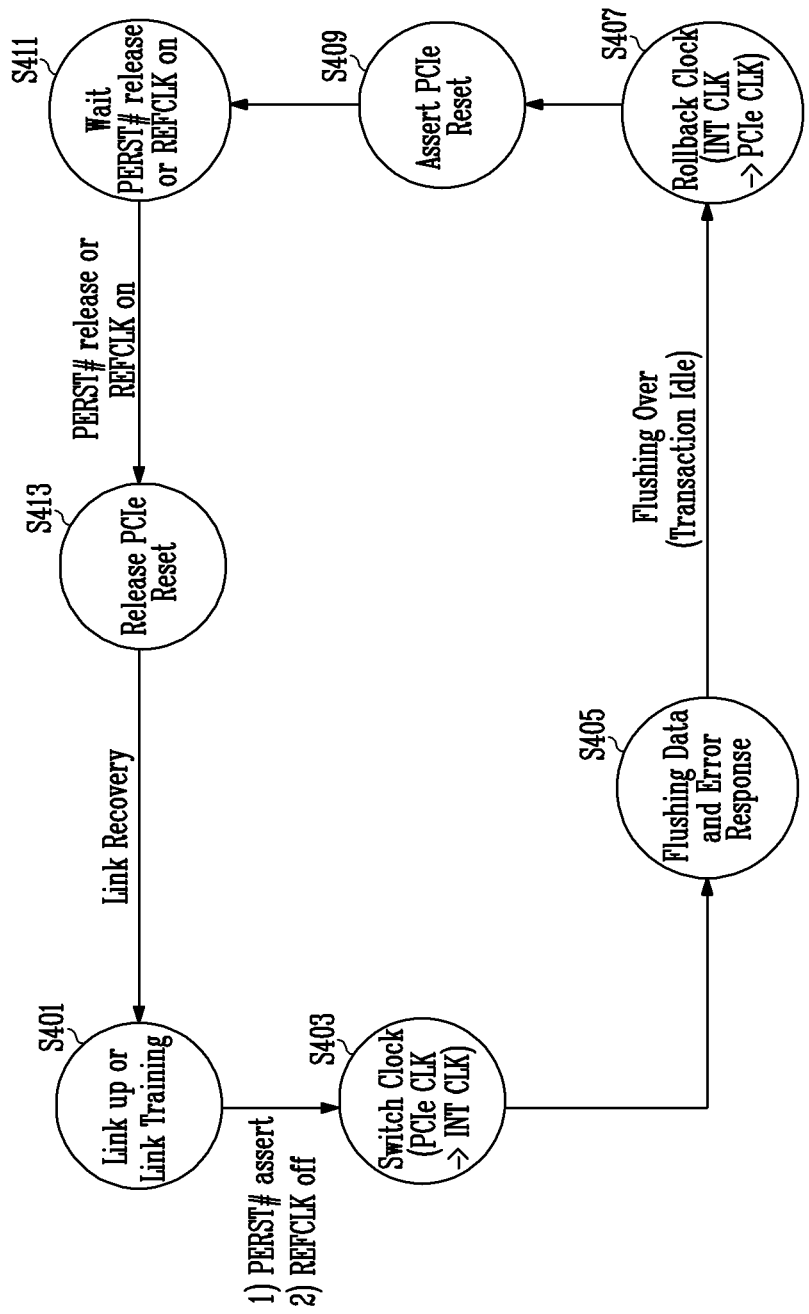
FIG. 4 is a diagram illustrating operations of a PCIe interface device according to an embodiment of the present disclosure.

FIG. 4 is a diagram illustrating operations of a PCIe interface device according to an embodiment of the present disclosure.

Referring to FIG. 4, at step S401, a link with respect to a host may be in a link up state or a link training state. When the reset signal PERST # is asserted or the reference clock (REF CLK) is off, step S401 may transition to step S403.

At step S403, the operating clock of the PCIe protocol stack may switch from the PCIe clock (PCIe CLK) to the internal clock (INT CLK).

At step S405, data in the PCIe protocol stack may be flushed, or error response processing of a request received from the DMA device may be performed. When the error response processing of the request received from the DMA device is completed, if a new request is not received, then a transaction with respect to the DMA device may be determined as idle, and step S405 may transition to step S407.

At step S407, the operating clock of the PCIe protocol stack may roll back from the internal clock (INT CLK) to the PCIe clock (PCIe CLK).

At step S409, the PCIe reset signal may be asserted.

At step S411, waiting occurs until the reset signal PERST # is released or the reference clock (REF CLK) is on. When the reset signal PERST # is released or the reference clock (REF CLK) is on, step S411 may transition to step S413.

At step S413, the PCIe reset signal may be released. When PCIe reset is completed, the link recovery operation may be performed, and step S413 may transition to step S401. The link with respect to the host may enter link training or the link up state as described above with reference to FIG. 3.

Figure 5:
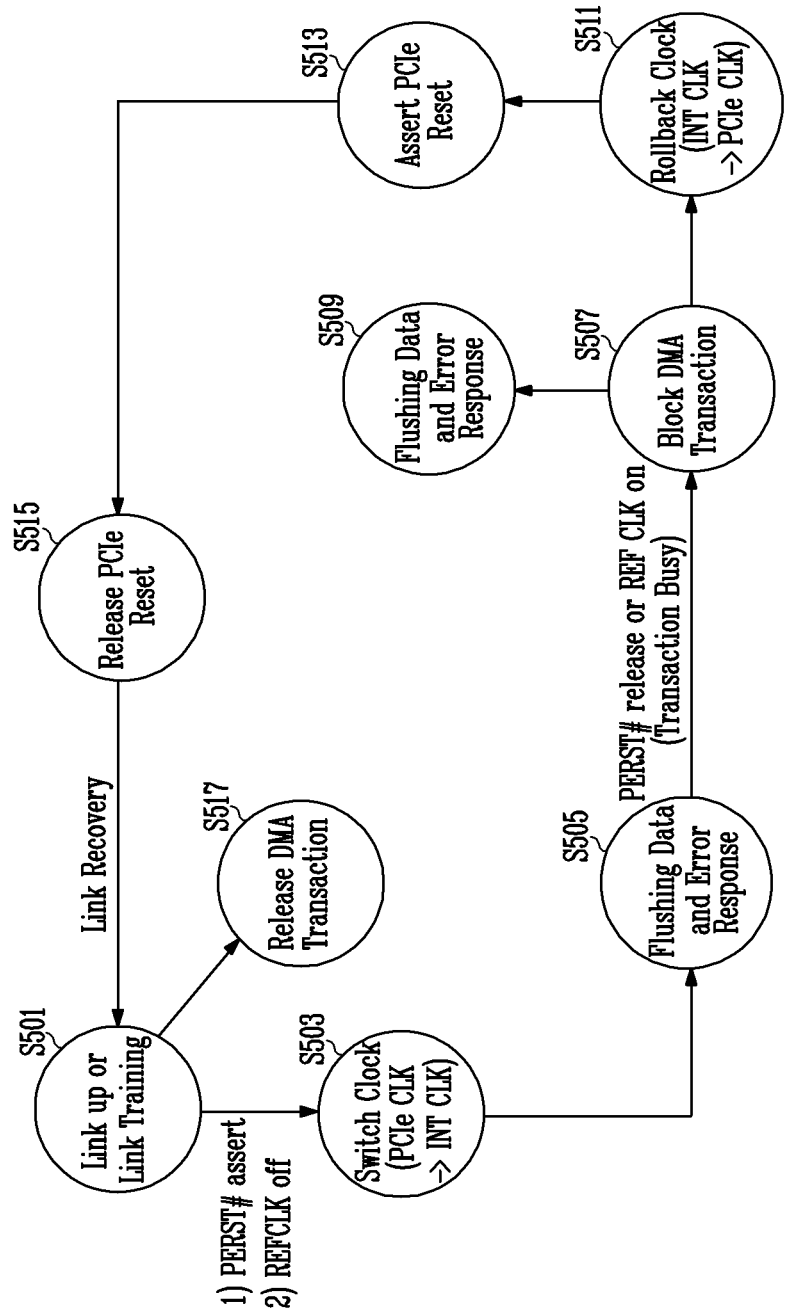
FIG. 5 is a diagram illustrating operations of a PCIe interface device according to an embodiment of the present disclosure.

FIG. 5 is a diagram illustrating operations of a PCIe interface device according to an embodiment of the present disclosure.

Referring to FIG. 5, at step S501, a link with respect to a host may be in a link up state or a link training state. When the reset signal PERST # is asserted or the reference clock (REF CLK) is off, step S501 may transition to step S503.

At step S503, the operating clock of the PCIe protocol stack may switch from the PCIe clock (PCIe CLK) to the internal clock (INT CLK).

At step S505, data in the PCIe protocol stack may be flushed, or error response processing of a request received from the DMA device may be carried out. When the error response processing of the request received from the DMA device is completed, and if a new request is not received, then, a transaction with respect to the DMA device may be determined as idle.

When the transaction is busy, if the reset signal PERST # is released or the reference clock (REF CLK) is on, then step S505 may transition to step S507.

At step S507, the transaction with respect to the DMA device may be blocked.

At step S509, when the transaction is blocked, flushing residual data and error response processing may be carried out while the transaction is blocked.

At step S511, the operating clock of the PCIe protocol stack may roll back from the internal clock (INT CLK) to the PCIe clock (PCIe CLK).

At step S513, the PCIe reset signal may be asserted.

At step S515, the PCIe reset signal may be released. When PCIe reset is completed, the link recovery operation may be performed, and step S515 may transition to step S501. The link with respect to the host may enter the link training or the link up state as described above with reference to FIG. 3.

At step S517, when link training is entered in the link recovery operation, the blocked DMA transaction may be released.

FIG. 6 is a flow chart illustrating operations of a PCIe interface device according to an embodiment of the present disclosure.

Referring to FIG. 6, at step S601, the PCIe interface device may detect whether a reset signal received from the host is asserted or the reference clock is off.

At step S603, the PCIe interface device may switch an operating clock from a PCIe clock, generated based on a reference clock, to an internal clock.

At step S605, the PCIe interface device may flush data in the PCIe protocol stack, or may perform error response processing of a request received from the DMA device.

At step S607, the PCIe interface device may determine whether a transaction with respect to the DMA device is idle or not. As a result of determination, when the transaction is idle, the process may proceed to step S609, and if the transaction is busy, the process may proceed to step S605. When the error response processing of the request received from the DMA device is completed, and a new request is not received, the PCIe interface device may determine the transaction with respect to the DMA device as idle.

At step S609, the PCIe interface device may roll back the operating clock from the internal clock to the PCIe clock.

At step S611, the PCIe interface device may reset the PCIe protocol stack, and may wait until a release of the reset signal is received from the host or the reference clock is on.

At step S613, the PCIe interface device may perform a link recovery operation on the host when the reset signal is released or the reference clock is on.

FIG. 7 is a flow chart illustrating operations of a PCIe interface device according to an embodiment of the present disclosure.

Referring to FIG. 7, at step S701, the PCIe interface device may detect whether a reset signal received from the host is asserted or the reference clock is off.

At step S703, the PCIe interface device may switch an operating clock from a PCIe clock, generated based on a reference clock, to an internal clock.

At step 705, the PCIe interface device may flush data in the PCIe protocol stack, or may carry out error response processing of a request received from the DMA device.

At step S707, the PCIe interface device may determine whether a transaction with respect to the DMA device is idle or not. As a result of determination, if the transaction is idle, the process may proceed to step S709, and if the transaction is busy, the process may proceed to step S713. When the error response processing of the request received from the DMA device is completed, and a new request is not received, the PCIe interface device may determine the transaction with respect to the DMA device as idle.

At step S709, the PCIe interface device may roll back the operating clock from the internal clock to the PCIe clock.

At step S711, the PCIe interface device may reset the PCIe protocol stack and may perform a link recovery operation on the host. Step S711 may correspond to step S611 and step S613 of FIG. 6.

At step S713, the PCIe interface device may determine whether the reset signal is released or the reference clock is on. As a result of determination, when the reset signal is released or the reference clock is on, the process may proceed to step S715, and if the reset signal is asserted and the reference clock is off, the process may proceed to step S705.

At step S715, the PCIe interface device may block a transaction with respect to the DMA device.

At step S717, the PCIe interface device may roll back the operating clock from the internal clock to the PCIe clock.

At step S719, the PCIe interface device may reset the PCIe protocol stack and may perform the link recovery operation on the host.

At step S721, the PCIe interface device may release the blocked transaction when link training starts in the link recovery operation.

At step S723, the PCIe interface device may flush residual data and process an error response when the transaction with respect to the DMA device is blocked.

According to the present disclosure, a PCIe interface device having improved link recovery performance and an operating method thereof may be provided.

In the above-discussed embodiments, all steps may be selectively performed or skipped. In addition, the steps in each embodiment may not always be performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure. It will be apparent to those skilled in the art that various modifications can be made to the above-described exemplary embodiments of the present disclosure without departing from the spirit or scope of the invention. Thus, it is intended that the present disclosure cover all such modifications provided they come within the scope of the appended claims and their equivalents.

What is claimed is:

1. A Peripheral Component Interconnect Express (PCIe) interface device, comprising:
    a PCIe protocol stack performing communication between a host and a Direct Memory Access (DMA) device; and
    a PCIe controller switching an operating clock from a PCIe clock, generated based on a reference clock, to an internal clock, processing data of the PCIe protocol stack on the basis of the internal clock, and recovering a link with respect to the host, when a reset signal received from the host is asserted or the reference clock is off.

2. The PCIe interface device of claim 1, wherein the PCIe controller comprises:
    a clock controller switching the operating clock from the PCIe clock to the internal clock when the reset signal is asserted or the reference clock is off; and
    a recovery controller flushing data of the PCIe protocol stack, processing a transaction with respect to the DMA device, resetting the PCIe protocol stack, and recovering the link with respect to the host on the basis of the internal clock.

3. The PCIe interface device of claim 2, wherein the clock controller rolls back the operating clock from the internal clock to the PCIe clock based on whether the transaction with respect to the DMA device is idle or whether the reset signal is released.

4. The PCIe interface device of claim 3, wherein the clock controller rolls back the operating clock from the internal clock to the PCIe clock when the transaction with respect to the DMA device is idle.

5. The PCIe interface device of claim 3, wherein the clock controller rolls back the operating clock from the internal clock to the PCIe clock when the transaction with respect to the DMA device is busy and the reset signal is released.

6. The PCIe interface device of claim 2, wherein the recovery controller provides the DMA device with an error response to a request received from the DMA device.

7. The PCIe interface device of claim 6, wherein the recovery controller determines the transaction with respect to the DMA device as idle when error response processing of the DMA device is completed.

8. The PCIe interface device of claim 2, wherein the recovery controller resets the PCIe protocol stack based on whether the transaction with respect to the DMA device is idle or whether the reset signal is released.

9. The PCIe interface device of claim 8, wherein the recovery controller asserts a PCIe reset signal with respect to the PCIe protocol stack when the transaction with respect to the DMA device is idle, and waits until the reset signal is released or the reference clock is on.

10. The PCIe interface device of claim 9, wherein the recovery controller releases the PCIe reset signal and initiates a link recovery operation between the host and the PCIe protocol stack when the reset signal is released or the reference clock is on.

11. The PCIe interface device of claim 8, wherein the recovery controller blocks the transaction with respect to the DMA device when the reset signal is released or the reference clock is on while the transaction with respect to the DMA device is busy.

12. The PCIe interface device of claim 11, wherein the recovery controller asserts the PCIe reset signal with respect to the PCIe protocol stack, releases the PCIe reset signal when resetting the PCIe protocol stack is completed, and performs a link recovery operation between the host and the PCIe protocol stack.

13. The PCIe interface device of claim 12, wherein the recovery controller releases a blocked transaction, flushes the data of the PCIe protocol stack, and processes a released transaction when link training is initiated in the link recovery operation.

14. The PCIe interface device of claim 13, wherein the recovery controller allows an inbound access of the host with respect to the DMA device when the transaction with respect to the DMA device is busy after a link up is completed in the link recovery operation.

15. The PCIe interface device of claim 1, wherein the PCIe protocol stack comprises at least one of a physical layer, a data link layer, and a transaction layer.

16. The PCIe interface device of claim 1, wherein the DMA device comprises at least one of a Non-Volatile Memory Express (NVMe) module, an Ethernet card, a sound card, a graphic card, an AI CPU module, and an AI SoC module.

17. A method of operating a Peripheral Component Interconnect Express (PCIe) interface device including a PCIe protocol stack performing communication between a host and a Direct Memory Access (DMA) device, the method comprising:
    switching an operating clock from a PCIe clock, generated based on a reference clock, to an internal clock, when a reset signal received from the host is asserted or the reference clock is off;

flushing data of the PCIe protocol stack on the basis of the internal clock; and processing a transaction with respect to the DMA device.

18. The method of claim 17, further comprising rolling back the operating clock from the internal clock to the PCIe clock on the basis of whether the transaction with respect to the DMA device is idle or whether the reset signal is released.

19. The method of claim 18, wherein the rolling back to the PCIe clock comprises rolling back the operating clock from the internal clock to the PCIe clock when the transaction with respect to the DMA device is idle.

20. The method of claim 18, wherein the rolling back of the PCIe clock comprises rolling back the operating clock from the internal clock to the PCIe clock when the transaction with respect to the DMA device is busy and the reset signal is released.

21. The method of claim 17, wherein the processing of the transaction with respect to the DMA device comprises:

receiving a request from the DMA device; and providing the DMA device with an error response to the request.

22. The method of claim 17, further comprising resetting the PCIe protocol stack based on whether the transaction with respect to the DMA device is idle or whether the reset signal is released.

23. The method of claim 22, wherein the resetting of the PCIe protocol stack comprises:

asserting a PCIe reset signal with respect to the PCIe protocol stack when the transaction with respect to the DMA device is idle;

waiting until the reset signal is released or the reference clock is on; and releasing the PCIe reset signal when the reset signal is released or the reference clock is on.

24. The method of claim 22, wherein the resetting of the PCIe protocol stack comprises:

asserting a PCIe reset signal with respect to the PCIe protocol stack when the reset signal is released or the reference clock is on while the transaction with respect to the DMA device is busy; and releasing the PCIe reset signal when the resetting of the PCIe protocol stack is completed.

25. The method of claim 22, further comprising performing a link recovery operation with respect to the host when the resetting of the PCIe protocol stack is completed.

26. The method of claim 25, further comprising:

blocking the transaction with respect to the DMA device when the reset signal is released while the transaction with respect to the DMA device is busy; and releasing a blocked transaction when link training is initiated in the link recovery operation.

27. The method of claim 17, wherein the PCIe protocol stack comprises at least one of a physical layer, a data link layer, and a transaction layer.

28. The method of claim 17, wherein the DMA device comprises at least one of a Non Volatile Memory Express (NVMe) module, an Ethernet card, a sound card, a graphic card, an AI CPU module, and an AI SoC module.

* * * * *